(12) United States Patent
Kneshtel, Jr. et al.

(10) Patent No.: US 8,342,477 B2
(45) Date of Patent: Jan. 1, 2013

(54) HINGED CLAMP BRACKET

(75) Inventors: Charles H. Kneshtel, Jr., Brownstown, MI (US); Mark S. Marek, Commerce, MI (US); Jerome Herman, Brownstown, MI (US); John A. Dzvowik, Royal Oak, MI (US); David Dominic, Jr., Ferndale, MI (US); Adrian J. Purvis, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 289 days.

(21) Appl. No.: 12/850,174

(22) Filed: Aug. 4, 2010

(65) Prior Publication Data
US 2011/0031364 A1 Feb. 10, 2011

Related U.S. Application Data

(60) Provisional application No. 61/231,305, filed on Aug. 4, 2009.

(51) Int. Cl.
*F16M 11/00* (2006.01)
(52) U.S. Cl. ............ 248/674; 248/72; 248/73; 248/214; 403/25; 403/234
(58) Field of Classification Search .................. 248/674, 248/62, 72, 73, 74.4, 214, 226.11, 228.1, 248/228.4, 231.51, 222.14; 24/279; 403/22, 403/25, 234, 235, 237, 241, 256
See application file for complete search history.

(56) References Cited

U.S. PATENT DOCUMENTS

| 4,526,756 | A | * | 7/1985 | Wong .......................... 422/566 |
| 6,131,859 | A | * | 10/2000 | Giuliano ........................ 248/62 |
| 6,974,276 | B2 | * | 12/2005 | Kirchner et al. ............. 403/385 |
| 8,100,368 | B2 | * | 1/2012 | Jackson et al. ................ 248/62 |
| 2007/0295867 | A1 | * | 12/2007 | Hennon ...................... 248/74.4 |

* cited by examiner

*Primary Examiner* — Bradley Duckworth
(74) *Attorney, Agent, or Firm* — Frederick A Krieger

(57) ABSTRACT

A clam-shell bracket for defining a mounting flange on a structural member, such as a hydroformed vehicle crossmember or frame rail, includes a lower body featuring an integrated locating feature with which to preposition the bracket on the structural member, and permanently-attached male threaded fasteners with which to thereafter secure the bracket to the structural member. The bracket further includes a hinged upper body having slotted bolt holes through which the lower body's fasteners may freely pass as the upper body is pivoted into the assembled position, thereby reducing the time required for bracket installation. The use of fasteners on the both the hinged end and opposite end of the lower clamp body provides an improved clamping force about the structural member, while the improved clamping force cooperates with the mating locating features of the bracket and the structural member to improve the lateral applied load transfer therebetween.

18 Claims, 4 Drawing Sheets

HINGED CLAMP BRACKET

CROSS-REFERENCE TO RELATED APPLICATIONS

This application claims benefit of U.S. provisional patent application no. 61/231,305 filed Aug. 4, 2009, the disclosure of which is hereby incorporated herein by reference.

BACKGROUND OF THE INVENTION

The invention relates to a hinged clamp bracket suitable for use, for example, in pivotally mounting an end of a vehicle suspension shock absorber to a hydroformed vehicle frame rail.

SUMMARY OF THE INVENTION

According to an aspect of the invention, a hinged clamp bracket for defining a mounting flange or other suitable attachment point on a structural member, such as a vehicle crossmember or frame rail, includes a lower body, and an upper body pivotally coupled to the lower body by a hinge formed on one end of each body. The bracket further includes at least one fastener to secure the other end of the upper and lower bodies together, to thereby clamp the bracket about the structural member. Preferably, the bracket also includes at least one additional fastener securing the respective hinge end of the bodies together, to achieve an improved clamping force about the structural member. In a preferred embodiment, the fasteners include a male threaded fastener, such as a weld stud, or a staked or clinched bolt, that is attached to each end of the bracket's lower body prior to assembly of the bracket about the structural member; and the upper body includes complementary slots to receive the male fasteners such that, when the upper body is pivoted about the hinge into the assembled position about the structural member, the ends of the male fasteners pass through the slots, whereupon the bracket is clamped about the structural member with mating female fasteners.

A hinged clamp bracket in accordance with the invention further includes at least one flange or other suitable structure with which to define an attachment point on the structural member. By way of example, in a preferred embodiment used to pivotally mount an end of a vehicle suspension shock absorber or damper to a vehicle crossmember or frame rail, the bracket's lower body features a pair of parallel-spaced flanges projecting from the lower body's second end, with each flange including an aperture with which to define a pivot axis for the shock absorber mount.

In accordance with another aspect of the invention, at least one of the bracket's upper and lower bodies includes a locating feature by which to positively locate the bracket on the structural member during installation of the bracket on the structural member. It will be appreciated that the complementary locating features also serve to maintain the assembled bracket in its desired post-assembly position on the crossmember or frame rail, while further serving to transfer lateral applied loads from the bracket to the structural member.

From the foregoing, it will be appreciate that a hinged clamp bracket in accordance with the invention advantageously features upper and lower clamp bodies that are pre-assembled to provide a clam-shell bracket with integrated locating feature that is readily positioned onto the crossmember or frame rail and subsequently secured to the crossmember or frame rail. The use of slotted bolt holes on the upper body allows the fasteners to be mounted on or secured to the lower body before the bracket is positioned on the frame rail, thereby reducing the time required for bracket installation. The shape of the upper and lower bodies, and the bracket's locating feature and the complementary feature in the structural member facilitate positive location of the bracket on the structural member.

Other objects, features, and advantages of the present invention will be readily appreciated upon a review of the subsequent description of the preferred embodiment and the appended claims, taken in conjunction with the accompanying Drawings.

DETAILED DESCRIPTION OF THE PREFERRED EMBODIMENT

Figure 1:
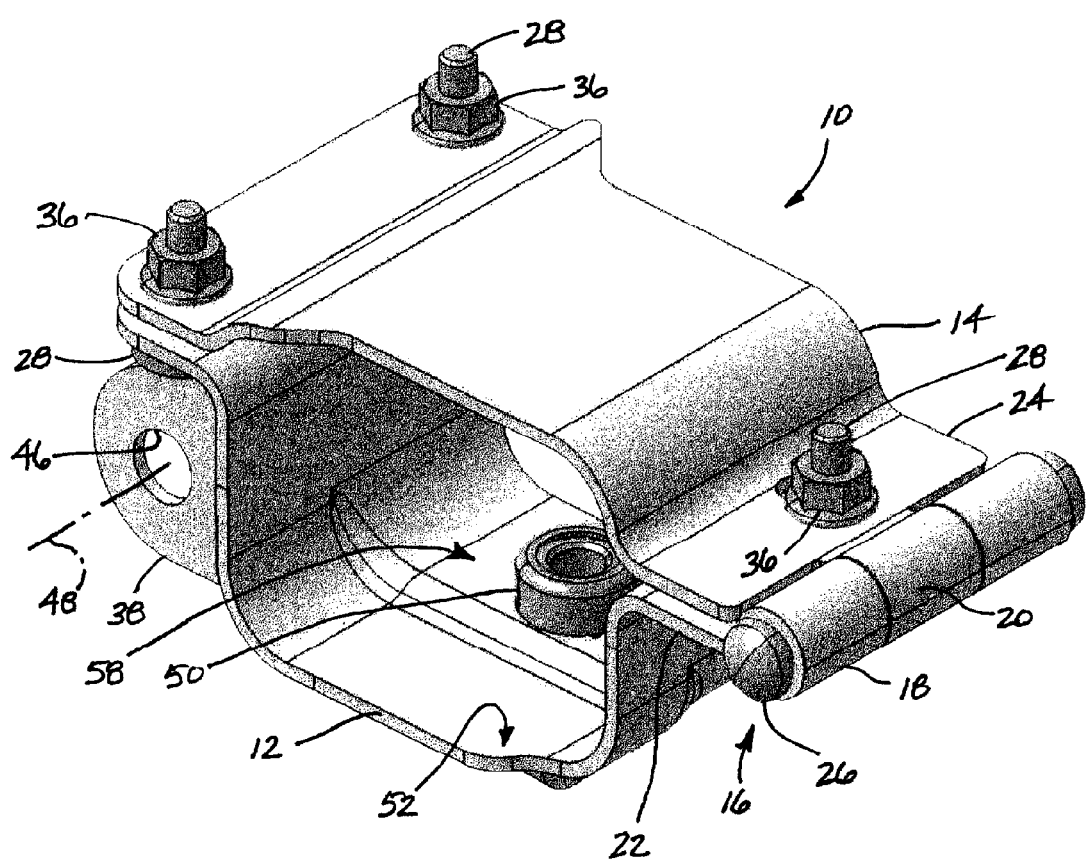
FIG. 1 is a perspective view of an exemplary hinged clamp bracket in accordance with the invention.
Figure 2:
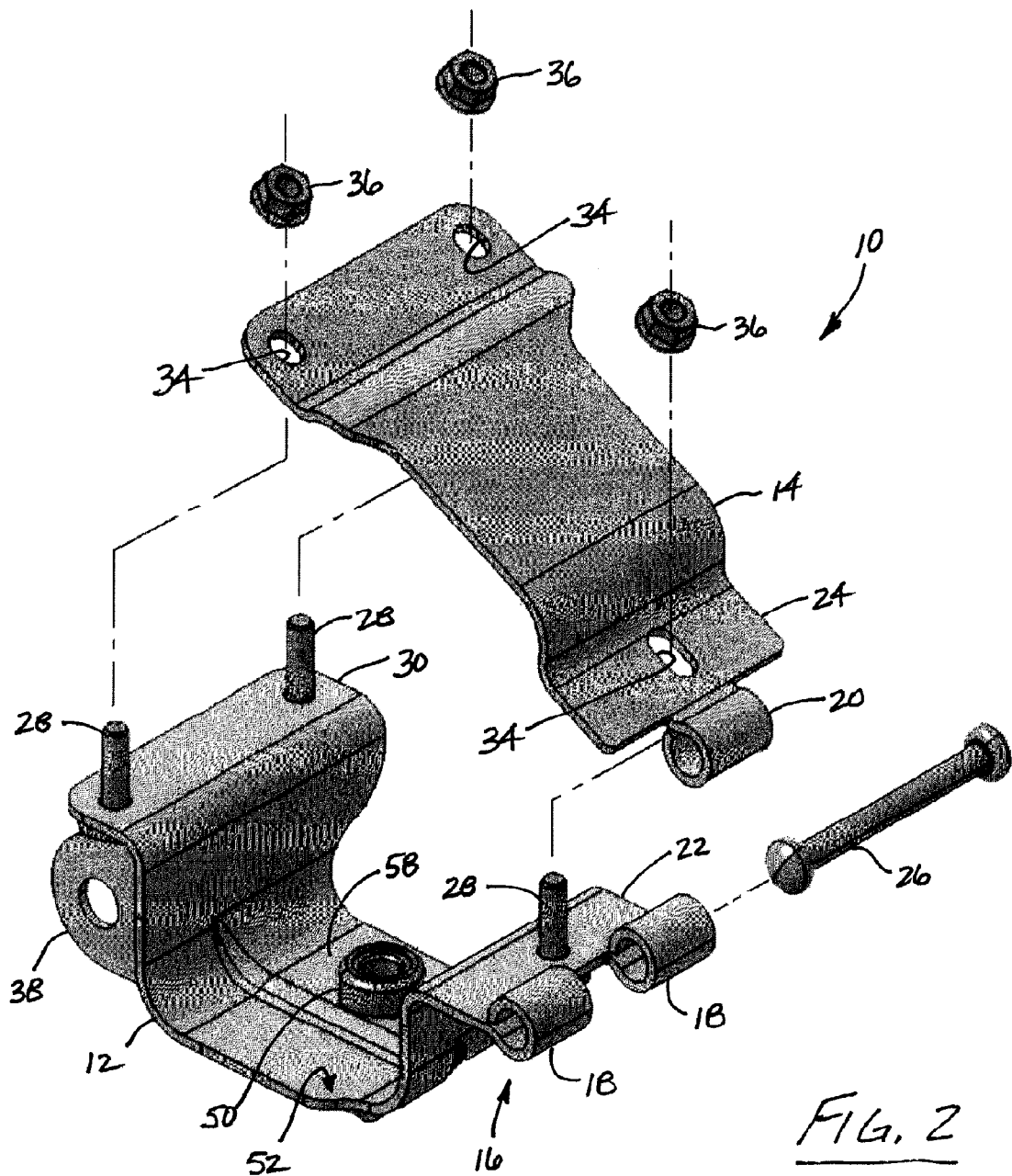
FIG. 2 is an exploded view of the hinged clamp bracket of FIG. 1.

Referring to FIGS. 1 and 2, an exemplary hinged clamp bracket 10 in accordance with the invention includes a lower body 12, and an upper body 14 pivotally coupled to the lower body 12 by a hinge 16 defined by cooperating hinge portions 18,20 at first end 22,24 of each body 12,14. The hinge 16 further includes a floating hinge pin 26 retained within the cooperating hinge portions 18,20 of the upper and lower bodies 12,14, for example, by rolling an end of the pin 26 subsequent to insertion through the hinge portions 18,20.

Figure 3:
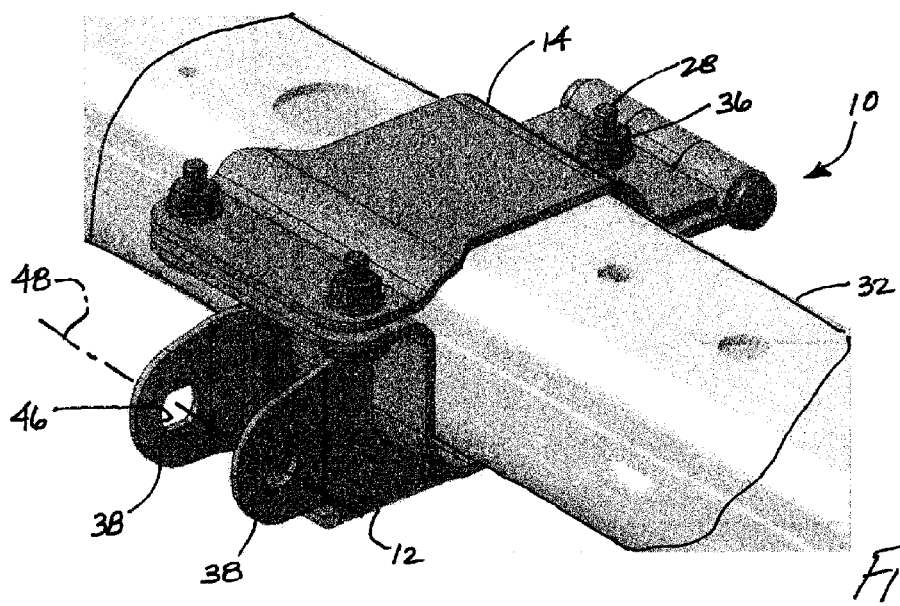
FIG. 3 is a perspective view of the bracket installed on a vehicle crossmember or frame rail, by which the bracket defines a pair of mounting flanges on the crossmember or frame rail.
Figure 4:
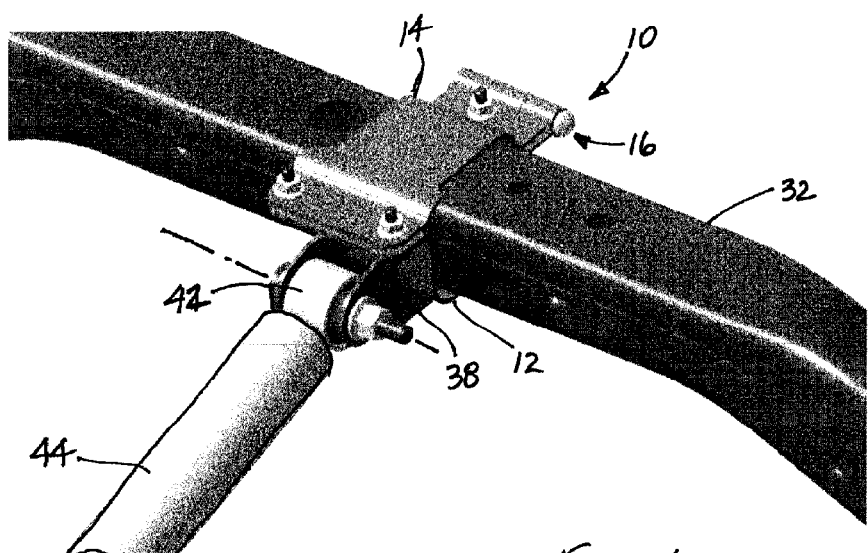
FIG. 4 is a partial perspective view of an end of a vehicle suspension shock absorber or damper that is pivotally mounted to the bracket's flanges.

Referring to FIGS. 2 and 3, the exemplary bracket 10 further includes at least one male fastener, such as a weld stud, or a staked or clinched bolt 28, disposed at each end 22,30 of the lower body 12. Each bolt 28 projects upward such that, when the upper body 14 is pivoted about the hinge 16 into the assembled position about the cross-member or frame rail 32, as seen in FIG. 3, the ends of the bolts 28 pass through complementary slots 34 defined in the upper body 14, whereupon the bracket 10 is clamped about the crossmember or frame rail 32 by complementary fasteners, such as nuts 36.

Referring again to FIG. 3, the exemplary bracket 10 includes at least one flange 38 defined on at least one of the bodies 12,14 to provide an attachment point 40. By way of example, where the exemplary bracket 10 is used to pivotally mount an end 42 of a vehicle suspension shock absorber or damper 44 to the crossmember or frame rail 32, the bracket's lower body 12 advantageously features a pair of parallel-spaced flanges 38 projecting from the lower body's second end 30. Each of the flanges 38 has an aperture 46 that together define the pivot axis 48 for the shock absorber mount.

While the invention contemplates achieving any suitable clamping force between the bracket's upper and lower bodies 12,14 upon tightening the fasteners 28,36, by way of example only, when an assembled bracket 10 in accordance with the invention is used to secure the end 42 of a vehicle suspension shock absorber or damper 44 to a frame rail 32, in a preferred embodiment, the clamping force is designed to withstand roughly five times the shear load applied to the bracket's flanges 38 by the shock absorber or damper 44.

Figure 5:
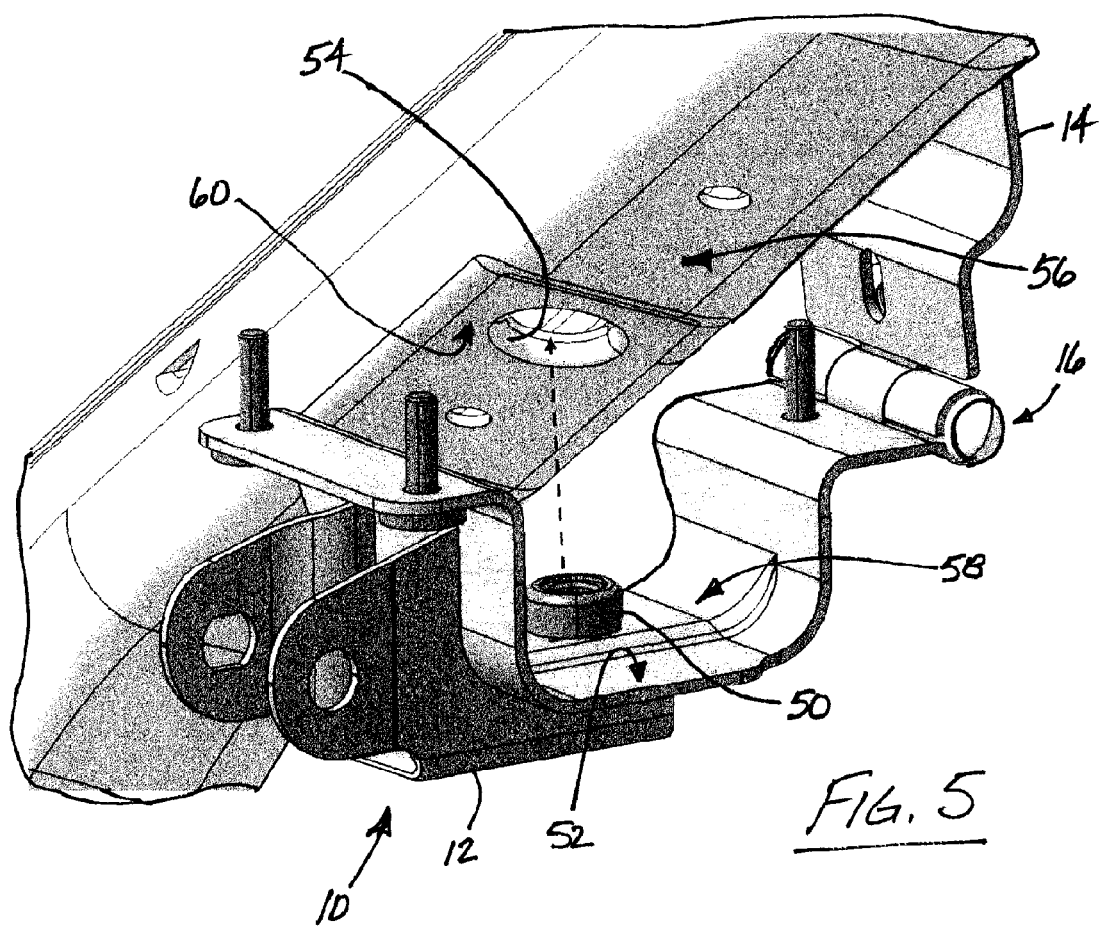
FIG. 5 is a perspective view showing alignment of the bracket's locating feature with a complementary locating feature defined in the crossmember or frame rail, in accordance with another aspect of the invention.

Referring to FIGS. 1, 2, and 5, and in accordance with another aspect of the invention, at least one of the bracket's upper and lower bodies 12,14 includes a locating feature 50, by which the bracket 10 is positively located onto the crossmember or frame rail 32 during installation of the bracket 10. By way of example only, in the exemplary bracket, the locating feature 50 is a raised boss disposed on the upper, mating surface 52 of the lower body 12. As best seen in FIG. 5, the crossmember or frame rail 32 is provided with a complementary locating feature, such as a complementary aperture 54 defined in an opposing surface 56, which receives the bracket's boss 50 as the bracket's lower body 12 is positioned against the crossmember or frame rail 32. By way of further example, the exemplary bracket's lower body 12 also includes a raised portion 58 that is received in a complementary recess 60 defined in the mating surface 56 of the crossmember or frame rail 32. It will be appreciated that these complementary locating features also serve to maintain the assembled bracket in its desired post-assembly position on the crossmember or frame rail, while further serving to transfer lateral applied loads from the bracket to the crossmember or frame rail 32.

While the above description constitutes the preferred embodiment, it will be appreciated that the invention is susceptible to modification, variation and change without departing from the proper scope and fair meaning of the subjoined claims.

What is claimed is:

1. A hinged clamp bracket for a structural member, comprising:
   a lower clamp body having a hinge end and a second end generally opposite to the hinge end;
   an upper clamp body having a hinge end and a second end generally opposite to the hinge end, the hinge end of the upper clamp body being pivotally coupled to the hinge end of the lower clamp body for relative rotation about a hinge axis;
   a first fastener adapted to secure the respective second ends of the upper and lower clamp bodies together, to thereby clamp the bracket about the structural member; and
   a second fastener on the lower clamp body proximate to the hinge end of the lower clamp body, the first fastener being adapted to secure the hinge end of the lower clamp body to the hinge end of the upper clamp body,
   wherein at least one of the lower clamp body and the upper clamp body includes a mating surface that is shaped to correspond and mate to a surface of the structural member; and
   the mating surface defines a locating feature adapted to engage a complementary feature on the surface of the structural member.

2. The hinged clamp bracket of claim 1, wherein the first end of the lower clamp body and the first end of the upper clamp body cooperate with a hinge pin to define a hinge.

3. The hinged clamp bracket of claim 1, wherein the first fastener is a male threaded fastener permanently attached to the lower clamp body prior to clamping the bracket on the structural member.

4. The hinged clamp bracket of claim 3, wherein the first fastener is a male threaded fastener selected from the group consisting of a weld stud, a staked bolt, and a clinched bolt.

5. The hinged clamp bracket of claim 3, wherein the upper clamp body defines a first complementary slot adapted to receive the first fastener as the upper clamp body is pivoted about the hinge axis into an assembled position about the structural member.

6. The hinged clamp bracket of claim 1, wherein the second fastener is a male threaded fastener permanently attached to the lower clamp body prior to clamping the bracket on the structural member.

7. The hinged clamp bracket of claim 6, wherein the second fastener is a male threaded fastener selected from the group consisting of a weld stud, a staked bolt, and a clinched bolt.

8. The hinged clamp bracket of claim 6, wherein the upper clamp body defines a first complementary slot adapted to receive the first fastener as the upper clamp body is pivoted about the hinge axis into an assembled position about the structural member.

9. The hinged clamp bracket of claim 1, wherein one of the upper and lower clamp bodies defines an attachment point by which a component can be mounted on the structural member when the bracket is installed on the structural member.

10. The hinged clamp bracket of claim 9, wherein the attachment point includes a pair of generally-parallel-spaced flanges, the flanges including aligned apertures defining a pivot axis for mounting the component.

11. The hinged clamp bracket of claim 9, wherein the attachment point is defined on the second end of the lower clamp bracket.

12. The hinged clamp bracket of claim 1, wherein the locating feature is a raised feature disposed on the mating surface of the lower clamp body intermediate the hinged and second ends of the lower clamp body.

13. The hinged clamp bracket of claim 1, wherein the locating feature is a raised boss defined on the mating surface of the lower clamp body intermediate the hinged and second ends of the lower clamp body.

14. A hinged clamp bracket for defining an attachment point on a hydroformed structural member adapted to pivotally mount a component to the structural member, wherein the structural member includes a locating recess defined in a surface thereof, the bracket comprising:
   a lower clamp body having a hinge end and a second end generally opposite to the hinge end, and an upper surface intermediate the hinged and second ends, the upper surface including a raised feature complementary to the locating recess of the structural member, the lower clamp body further including a pair of generally-parallel-spaced flanges, each flange including an aperture defining a pivot axis for mounting the component;
   an upper clamp body having a hinge end and a second end generally opposite to the hinge end, the hinge end of the upper clamp body being pivotally coupled to the hinge end of the lower clamp body for relative rotation about a hinge axis;
   a first fastener permanently attached to the lower clamp body proximate to the second end thereof for securing the respective second ends of the upper and lower clamp bodies together, to thereby clamp the bracket about the structural member; and
   a second fastener permanently attached to the lower clamp body proximate to the hinge end thereof for securing the hinge end of the lower clamp body to the hinge end of the upper clamp body.

15. The bracket of claim 14, wherein the first end of the lower clamp body and the first end of the upper clamp body cooperate with a hinge pin to define a hinge.

16. The bracket of claim 14, wherein at least one of the first and second fastener is a male threaded fastener selected from the group consisting of a weld stud, a staked bolt, and a clinched bolt.

17. The bracket of claim 14, wherein the upper clamp body defines first and second complementary slots respectively adapted to receive the first and second fasteners as the upper clamp body is pivoted about the hinge axis into an assembled position about the structural member.

18. The hinged clamp bracket of claim 14, wherein the raised feature on the lower clamp body is a boss projecting from the upper surface of the lower clamp body, the boss being adapted to transfer loads to the structural member.

* * * * *